United States Patent
Orlando et al.

(10) Patent No.: US 7,681,399 B2
(45) Date of Patent: Mar. 23, 2010

(54) TURBOFAN ENGINE COWL ASSEMBLY AND METHOD OF OPERATING THE SAME

(75) Inventors: Robert Joseph Orlando, West Chester, OH (US); Thomas Ory Moniz, Loveland, OH (US); Jorge Francisco Seda, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 799 days.

(21) Appl. No.: 11/559,773

(22) Filed: Nov. 14, 2006

(65) Prior Publication Data

US 2008/0112802 A1 May 15, 2008

(51) Int. Cl.
*F02K 1/00* (2006.01)

(52) U.S. Cl. .................. 60/770; 60/771; 60/226.1; 239/265.19

(58) Field of Classification Search .............. 60/226.1, 60/770, 771, 226.3, 262; 239/265.19; 244/54; 248/554
See application file for complete search history.

(56) References Cited

U.S. PATENT DOCUMENTS

| | | | | |
|---|---|---|---|---|
| 3,015,936 | A * | 1/1962 | Brewer et al. | 239/265.19 |
| 3,018,620 | A * | 1/1962 | Meyer | 239/265.19 |
| 3,829,020 | A | 8/1974 | Stearns | |
| 4,039,149 | A | 8/1977 | Gajdos | |
| 4,043,508 | A * | 8/1977 | Speir et al. | 239/265.19 |
| 4,077,206 | A * | 3/1978 | Ayyagari | 60/262 |
| 4,409,788 | A | 10/1983 | Nash et al. | |
| 5,372,006 | A * | 12/1994 | Lair | 60/226.2 |
| 5,746,047 | A * | 5/1998 | Steyer et al. | 60/39.5 |
| 5,778,659 | A | 7/1998 | Duesler | |
| 5,785,249 | A * | 7/1998 | Metezeau et al. | 239/265.19 |
| 5,799,903 | A * | 9/1998 | Vauchel | 244/110 B |
| 5,806,302 | A | 9/1998 | Cariola | |
| 5,996,937 | A * | 12/1999 | Gonidec et al. | 244/110 B |
| 6,070,407 | A | 6/2000 | Newton | |
| 6,253,540 | B1 * | 7/2001 | Chew et al. | 60/262 |
| 6,725,542 | B1 | 4/2004 | Maguire | |
| 6,945,031 | B2 * | 9/2005 | Lair | 60/226.1 |
| 7,430,852 | B2 * | 10/2008 | Beutin et al. | 60/226.1 |
| 2008/0112801 | A1 * | 5/2008 | Moniz et al. | 415/208.1 |

FOREIGN PATENT DOCUMENTS

GB 2308866 A1 9/1997

* cited by examiner

*Primary Examiner*—William H Rodríguez
(74) *Attorney, Agent, or Firm*—William Scott Andes, Esq.; Armstrong Teasdale LLP

(57) ABSTRACT

A turbofan engine assembly is provided. The turbofan engine assembly includes a core gas turbine engine, a core cowl which circumscribes the core gas turbine engine, a nacelle positioned radially outward from the core cowl, a fan nozzle duct defined between the core cowl and the nacelle, and an inner core cowl baffle assembly positioned within the fan nozzle duct. The inner core cowl baffle assembly includes a first core cowl baffle coupled to a portion of the core cowl within the fan nozzle duct, a second core cowl baffle coupled to a portion of the core cowl and positioned a distance radially inward from the first core cowl baffle, and an actuator assembly configured to vary the throat area of the fan nozzle duct by selectively repositioning the second core cowl baffle with respect to the first core cowl baffle. A method for operating the turbofan engine assembly is also provided.

20 Claims, 3 Drawing Sheets

TURBOFAN ENGINE COWL ASSEMBLY AND METHOD OF OPERATING THE SAME

BACKGROUND OF THE INVENTION

This invention relates generally to turbofan engines, and more particularly to an inner core cowl baffle that may be utilized with a turbofan engine.

At least one known turbofan engine includes a fan assembly, a core gas turbine engine enclosed in an annular core cowl, and a fan nacelle that surrounds a portion of the core gas turbine engine. The fan nacelle is spaced radially outward from the annular core cowl such that the core cowl and fan nacelle form a fan nozzle duct having a discharge area (A18).

At least some known turbofan engines include a thrust reverser assembly. Known thrust reverser assemblies include a first fixed cowl and a second cowl that is axially translatable with respect to the first cowl. Generally, an actuator is coupled to the second cowl to reposition the second cowl with respect to the first cowl. As the second cowl is repositioned, airflow is discharged from the fan nozzle duct through the thrust reverser assembly. However, if the engine assembly does not include a thrust reverser assembly, the area of the fan nozzle duct becomes fixed and affects the efficiency of the fan assembly.

BRIEF DESCRIPTION OF THE INVENTION

In one aspect, a method for operating a turbofan engine assembly is provided. The turbofan engine assembly includes a core gas turbine engine, a core cowl which circumscribes the core gas turbine engine, a nacelle positioned radially outward from the core cowl, a fan nozzle duct defined between the core cowl and the nacelle, and a first core cowl baffle positioned within the fan nozzle duct and a second core cowl baffle wherein a portion of the second core cowl baffle is repositionable with respect to the first core cowl baffle. The method includes varying an operating speed of the fan assembly from a first operating speed to a second operating speed, and selectively positioning a portion of the second core cowl baffle between a first operational position and a second operational position with respect to the first core cowl baffle to vary a throat area of the fan nozzle duct to facilitate improving engine efficiency at the second operating speed.

In a further aspect, an inner core cowl baffle assembly for a turbofan engine assembly is provided. The turbofan engine assembly includes a core gas turbine engine, a core cowl which circumscribes the core gas turbine engine, a nacelle positioned radially outward from the core cowl, and a fan nozzle duct defined between the core cowl and the nacelle. The inner core cowl baffle assembly includes a first core cowl baffle coupled to a portion of the core cowl within the fan nozzle duct, a second core cowl baffle coupled to a portion of the core cowl and positioned a distance radially inward from the first core cowl baffle, and an actuator assembly configured to vary the throat area of the fan nozzle duct by selectively repositioning the second core cowl baffle with respect to the first core cowl baffle.

In a further aspect, a turbofan engine assembly is provided. The turbofan engine assembly includes a core gas turbine engine, a core cowl which circumscribes the core gas turbine engine, a nacelle positioned radially outward from the core cowl, a fan nozzle duct defined between the core cowl and the nacelle, and an inner core cowl baffle assembly positioned within the fan nozzle duct. The inner core cowl baffle assembly includes a first core cowl baffle coupled to a portion of the core cowl within the fan nozzle duct, a second core cowl baffle coupled to a portion of the core cowl and positioned a distance radially inward from the first core cowl baffle, and an actuator assembly configured to vary the throat area of the fan nozzle duct by selectively repositioning the second core cowl baffle with respect to the first core cowl baffle.

DETAILED DESCRIPTION OF THE INVENTION

Figure 1:
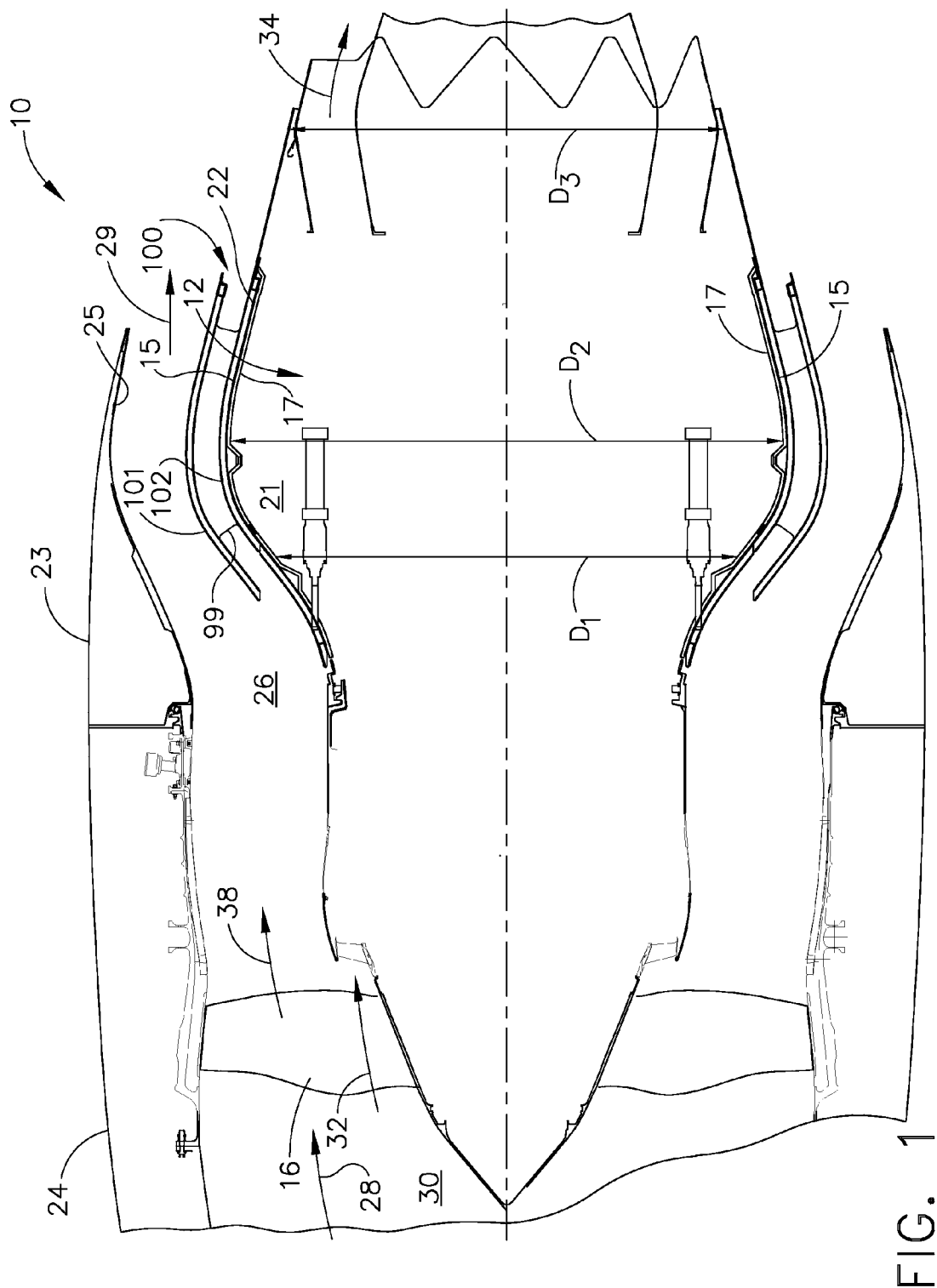
FIG. 1 is a schematic view of an exemplary aircraft turbofan engine assembly that includes an exemplary core cowl assembly.
Figure 2:
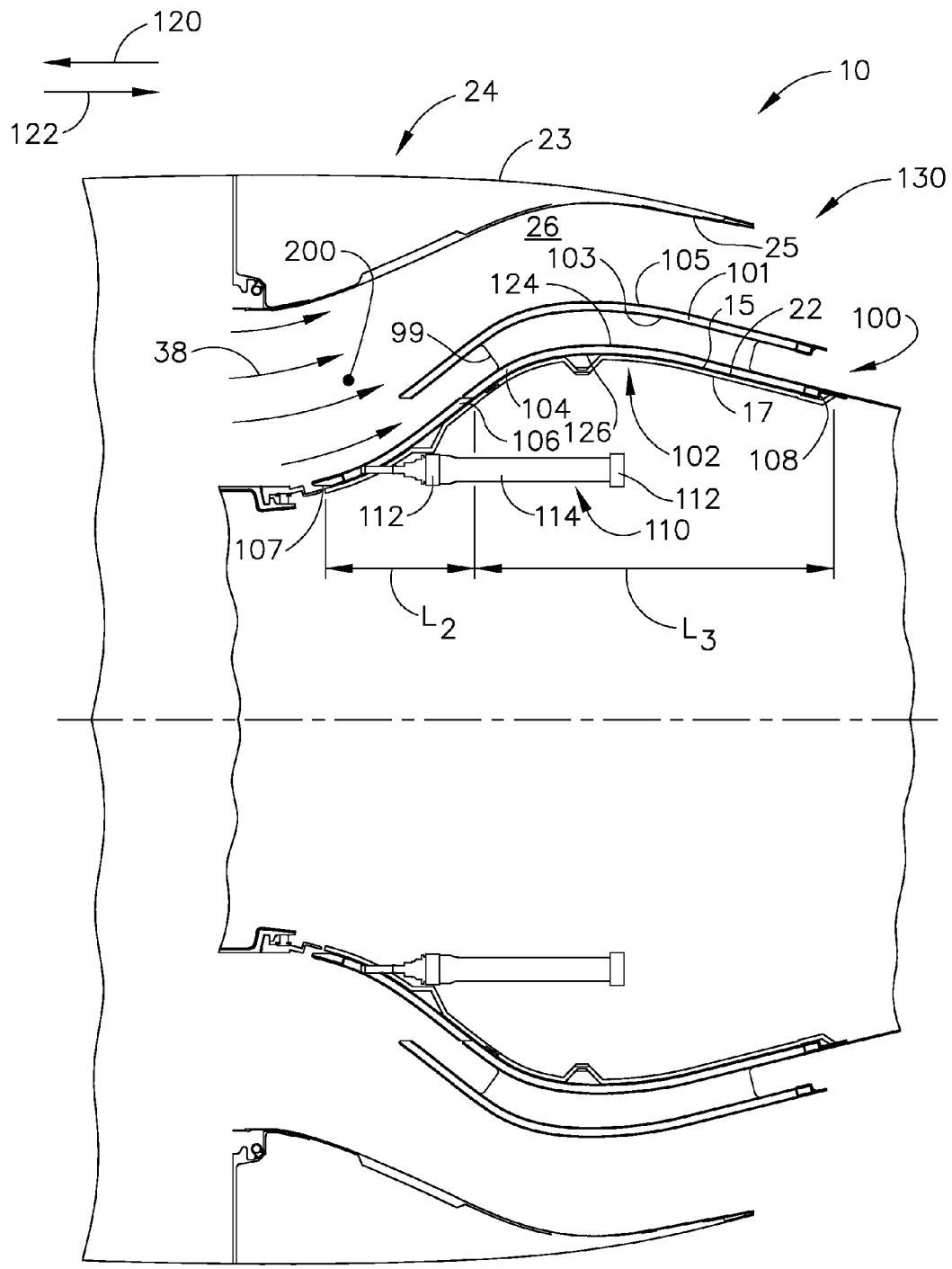
FIG. 2 is a partly sectional side view of the core cowl assembly shown in FIG. 1 in a first operational position.
Figure 3:
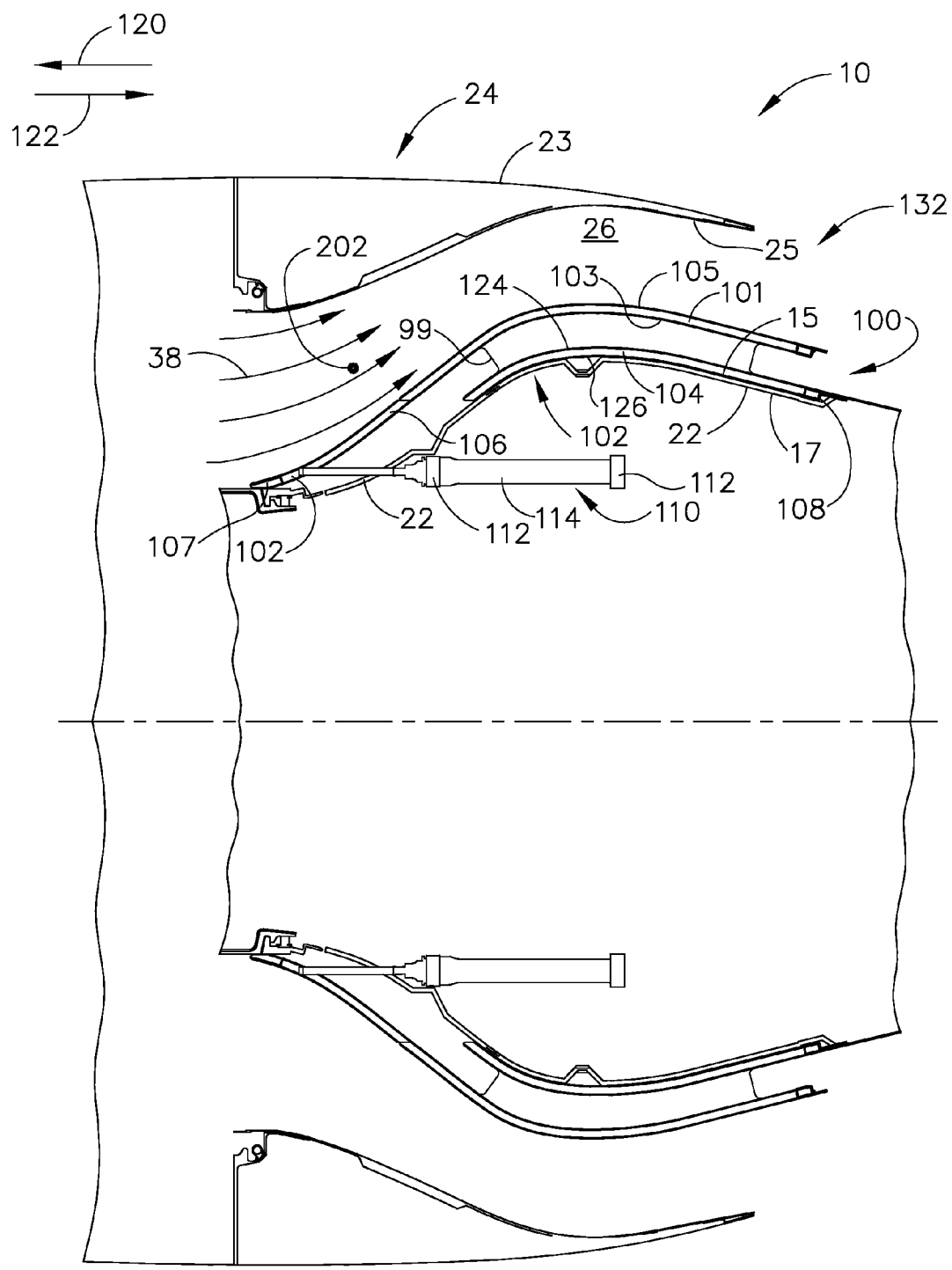
FIG. 3 is a partly sectional side view of the core cowl assembly shown in FIGS. 1 and 2 in a second operational position.

FIG. 1 is a schematic view of exemplary turbofan engine assembly 10 that includes an inner core cowl baffle assembly 100. FIG. 2 is a partly sectional side view of inner core cowl baffle assembly 100 in a first operational position 130. FIG. 3 is a partly sectional side view of the inner core cowl baffle assembly 100 in a second operational position 132.

In the exemplary embodiment, turbofan engine assembly 10 includes a core gas turbine engine 20 that includes a high-pressure compressor, a combustor, and a high-pressure turbine (all not shown). Turbofan engine assembly 10 also includes a low-pressure turbine (not shown) that is disposed axially downstream from core gas turbine engine 20, and a fan assembly 16 that is disposed axially upstream from core gas turbine engine 20. In the exemplary embodiment, turbofan engine assembly 10 includes an annular core cowl 22 that extends around core gas turbine engine 20 and includes a radially outer surface 15 and a radially inner surface 17. In the exemplary embodiment, core cowl 22 includes a first portion 19 that surrounds the high-pressure compressor and the combustor, and a second portion 21 that surrounds the high-pressure turbine and the low-pressure turbine. Turbofan engine assembly 10 also includes an inlet 30, a first outlet 29, and a second outlet 34.

Turbofan engine assembly 10 further includes a fan nacelle 24 that surrounds fan assembly 16 and is spaced radially outward from core cowl 22. Nacelle 24 includes a radially outer surface 23 and a radially inner surface 25. A fan nozzle duct 26 is defined between radially outer surface 15 of core cowl 22 and radially inner surface 25 of nacelle 24.

In the exemplary embodiment, turbofan engine assembly 10 includes a second core cowl baffle 102 such that a portion of second core cowl baffle 102 is axially translatable and will be discussed in more detail below.

During operation, airflow 28 enters inlet 30, flows through fan assembly 16, and is discharged downstream. A first portion 32 of airflow 28 is channeled through core gas turbine engine 20, compressed, mixed with fuel, and ignited for generating combustion gases which are discharged from core gas turbine engine 20 through second outlet 34. A second portion 38 of airflow 28 is channeled downstream through fan nozzle duct 26 which is discharged from fan nozzle duct 26 through first outlet 29.

In the exemplary embodiment, inner core cowl baffle assembly 100 includes a stationary first core cowl baffle 101 positioned within duct 26 and positioned radially outward from core cowl 22, a second core cowl baffle 102 wherein a portion of second core cowl baffle 102 is axially translatable with respect to core cowl 22, and an actuator assembly 110. In the exemplary embodiment, second core cowl baffle 102 is coupled to core cowl 22 and is positioned along radially outer surface 15 of core cowl 22. In an alternative embodiment, turbofan engine assembly 10 includes a first and second outer core cowl baffle (not shown) positioned along a portion of radially inner surface 25 of nacelle 24 wherein the outer core cowl baffles are similar to core cowl baffles 101 and 102.

In the exemplary embodiment, second portion 21 of core cowl 22 surrounding the high-pressure turbine and the low-pressure turbine has a first diameter $D_1$, a second diameter $D_2$ measured at a position downstream from first diameter $D_1$, and a third diameter $D_3$ measured at a position downstream from second diameter $D_2$. In the exemplary embodiment, first diameter $D_1$ is less than second diameter $D_2$, and third diameter $D_3$ is substantially equal to first diameter $D_1$. Similarly, a radially inner surface of second core cowl baffle 102 substantially conforms to the radially outer surface 15 of core cowl 22. Moreover, a radially inner surface of first core cowl baffle 101 substantially conforms to the radially outer surface 15 of core cowl 22.

In the exemplary embodiment, first core cowl baffle 101 is stationary and is positioned within fan nozzle duct 26 such that first core cowl baffle 101 is held in place with at least one strut 99. Strut 99 extends radially outward from core cowl 22 to first core cowl baffle 101. First core cowl baffle 101 includes a radially inner surface 103 and a radially outer surface 105. Optionally, first core cowl baffle 101 includes fixed noise reduction panels (not shown) along at least one radially inner and outer surface 103 and 105 of first core cowl baffle 101. In the exemplary embodiment, noise reduction panels are acoustic material and reduce noise.

Inner core cowl baffle assembly 100 also includes second core cowl baffle 102. Second core cowl baffle 102 includes a radially outer surface 124 and a radially inner surface 126. Second core cowl baffle 102 includes two portions, a first portion 104 and a second portion 106 located upstream from first portion 104. In the exemplary embodiment, second portion 106 is axially translatable and coupled to core cowl 22, and first portion 104 is stationary with respect to core cowl 22. Second portion 106 translates forward to reduce the area (A18) of the fan nozzle duct 26. In an alternative embodiment, first and second portions 104 and 106 are stationary. In a further alternative embodiment, first and second portions 104 and 106 are axially translatable within duct 26. In the exemplary embodiment, second core cowl baffle 102 is positioned along a radially outer surface 15 of core cowl 22 such that second core cowl baffle 102 is positioned flush against core cowl 22. Second core cowl baffle 102 extends between a first end 107 and a second end 108. In the exemplary embodiment, first and second ends 107 and 108 may be tapered to prevent disruption of second portion 38 of airflow 28. In the exemplary embodiment, first portion 104 has a length $L_1$ extending from second end 108 towards first end 107, and second portion 106 has a length $L_2$ extending from first end 107 towards second end 108 such that first and second portions 104 and 106 form second core cowl baffle 102.

In the exemplary embodiment, inner core cowl baffle assembly 100 also includes actuator assembly 110 that is coupled to second portion 106 to facilitate selectively translating second portion 106 in a general axial direction relative to first portion 104 and core cowl 22. Specifically, actuator assembly 110 selectively translates second portion 106 in a general axial direction relative to core cowl 22 to vary the fan nozzle duct area (A18). In the exemplary embodiment, actuator assembly 110 is positioned within second portion 21 of core cowl 22. Alternatively, actuator assembly 110 may be coupled to any portion of core cowl 22. Actuator assembly 110 includes a plurality of circumferentially-spaced apart actuators or motors 112, and a plurality of extending rods 114, such as, but not limited to, ball screws. In the exemplary embodiment, each rod 114 is coupled to a respective motor 112 and to second portion 106 such that energizing motors 112 causes second portion 106 to be translated in either a forward direction 120 or an aft direction 122 depending on the energization of motors 112. In the exemplary embodiment, actuator assembly 110 may be, but is not limited to, electrically, pneumatically, or hydraulically powered to translate second portion 106 from a first operational or stowed position 130 wherein airflow is discharged unimpeded (shown in FIG. 2) to a second operational position 132 (shown in FIG. 3) wherein second portion 106 is translated in forward direction 120 such that second portion 106 is positioned radially outward from core cowl 22 and is radially aligned with first core cowl baffle 101.

During operation of an aircraft, a pilot/operator may selectively position second portion 106 of second core cowl baffle 102 in first or second operational position 130 and 132. For example, the operator may selectively position second portion 106 in first operational position (i.e. stowed position) 130 while the aircraft is operating in a cruise mode (i.e. during normal flight conditions). In first operational position 130, a portion of second portion 106 abuts a portion of first portion 104. In first operational position 130, second portion 106 is fully retracted against core cowl 22 such that fan nozzle duct 26 has a first fan nozzle duct area 200 defined between radially inner surface 25 of nacelle 24 and radially outer surface 124 of second portion 106 of second core cowl baffle 102. When second portion 106 is positioned flush against a portion of core cowl 22 in first operational position 130, substantially all of second portion 38 of airflow 28 discharged from fan assembly 16 is channeled through fan nozzle duct 26. In the exemplary embodiment, first operational position 130 is used for normal flight conditions. In first operational position 130, second portion 38 of airflow 28 flows along both radially inner surface 103 and radially outer surface 105 of first core cowl baffle 101 and along radially outer surface 124 of second core cowl baffle 102.

When the aircraft is in off-design flight conditions (such as descent, landing, or other low-thrust conditions), the pilot/operator may optionally select second operational position 132 by axially translating second portion 106 in forward direction 120 from first operational position 130 to reduce the fan duct area (A18). Specifically, in second operational position 132, second portion 106 is partially extended from core cowl 22 such that fan nozzle duct 26 has a second fan nozzle duct area 202 defined between radially inner surface 25 of nacelle 24 and radially outer surface 124 of second portion 106. In the exemplary embodiment, second fan nozzle duct area 202 is less than first fan nozzle duct area 200 such that reducing first fan nozzle duct area 200 to second fan nozzle duct area 202 reduces the amount of discharged airflow within fan nozzle duct 26, and increases fan discharge pressure, such that the efficiency of fan assembly 16 is increased. Furthermore, in second operational position 132, second portion 106 is substantially radially aligned with first core cowl baffle 101. Specifically, a portion of second portion 106 contacts a portion of first core cowl baffle 101. Moreover, in second operational position 132, substantially all of second portion 38 of airflow 28 is channeled through fan nozzle duct 26 and flows along only radially outer surface 105 of first core cowl baffle 101. When second portion 106 is in second operational position 132, partially extended, nacelle 24 operates at performance similar to the current production nacelles. The second core cowl baffle 102 with a translating portion and stationary first core cowl baffle 101 described herein improves engine performance and fan efficiency. Closing of the fan nozzle duct area during certain operating conditions, such as take-off or descent, can improve fuel burn by raising the fan operating line closer to the peak efficiency line. In addition, reduced noise is achieved as a result of reduced fan wake/outlet guide vane (OGV) interaction. Moreover, opening the fan nozzle during certain operating conditions, such as low altitude, can also reduce noise as a result of reduced jet velocity. Noise reduction benefit of varying the fan nozzle (VFN) can also be traded to further reduce fan diameter and corresponding fuel burn.

The method herein includes coupling the first core cowl baffle to a portion of the core gas turbine engine within the fan nozzle duct, and selectively positioning the second core cowl baffle between a first operational position and a second operational position with respect to the first core cowl to vary the fan nozzle duct area increasing efficiency of the fan.

Described herein is a core cowl assembly including a core cowl, a first core cowl baffle, and a second core cowl baffle such that a portion of second core cowl baffle is axially translatable with respect to the core cowl. Such a core cowl assembly may be utilized on a wide variety of turbofan engine assemblies coupled to an aircraft. The core cowl baffle described herein improves engine performance during off-design flight conditions by reducing the fan nozzle duct area while simultaneously directing a substantial amount of air through the fan nozzle duct. This inner core cowl baffle assembly is a relatively low cost and low weight modification to the nacelle and the thrust reverser assembly and increases engine efficiency.

An exemplary embodiment of a core cowl assembly for a gas turbine engine assembly is described above in detail. The assembly illustrated is not limited to the specific embodiments described herein, but rather, components of each assembly may be utilized independently and separately from other components described herein.

While the invention has been described in terms of various specific embodiments, those skilled in the art will recognize that the invention can be practiced with modification within the spirit and scope of the claims.

What is claimed is:

1. A method for operating a turbofan engine assembly including a core gas turbine engine, a core cowl which circumscribes the core gas turbine engine, a nacelle positioned radially outward from the core cowl, a fan nozzle duct defined between the core cowl and the nacelle, and a first core cowl baffle positioned within the fan nozzle duct and a second core cowl baffle wherein a portion of the second core cowl baffle is repositionable with respect to the first core cowl baffle, said method comprising:

varying an operating speed of the fan assembly from a first operating speed to a second operating speed; and selectively positioning a portion of the second core cowl baffle between a first operational position and a second operational position with respect to the first core cowl baffle to vary a throat area of the fan nozzle duct to facilitate improving engine efficiency at the second operating speed.

2. A method in accordance with claim 1 wherein selectively positioning a portion of the second core cowl baffle further comprises positioning the second core cowl baffle substantially flush against a portion of the core cowl to facilitate maximizing engine thrust.

3. A method in accordance with claim 1 wherein selectively positioning a portion of the second core cowl baffle further comprises positioning a portion of the second core cowl baffle a distance away from the core cowl to facilitate maximizing engine efficiency.

4. A method in accordance with claim 3 wherein selectively positioning a portion of the second core cowl baffle further comprises positioning a portion of the second core cowl baffle a distance away from the core cowl such that a portion of the second core cowl baffle is radially aligned with a portion of the first core cowl baffle to facilitate maximizing engine efficiency.

5. A method in accordance with claim 1 wherein selectively positioning a portion of the second core cowl baffle further comprises positioning the second core cowl baffle a distance away from the core cowl to facilitate maintaining fan efficiency.

6. A method in accordance with claim 1 wherein said method further comprises axially translating the core cowl baffle in a forward direction such that the fan nozzle duct throat area is reduced.

7. A method in accordance with claim 1 wherein at least one of the first core cowl baffle and the second core cowl baffle comprises at least one noise reduction panel, said method further comprising positioning a portion of the second core cowl baffle in at least one of the first operational position and the second operational position to direct the airflow through the fan nozzle duct to facilitate reducing noise using the at least one noise reduction panel.

8. An inner core cowl baffle assembly for a turbofan engine assembly including a core gas turbine engine, a core cowl which circumscribes the core gas turbine engine, a nacelle positioned radially outward from the core cowl, and a fan nozzle duct defined between the core cowl and the nacelle, said inner core cowl baffle assembly comprising:

a first core cowl baffle coupled to a portion of said core cowl within said fan nozzle duct;

a second core cowl baffle coupled to a portion of said core cowl and positioned a distance radially inward from said first core cowl baffle; and an actuator assembly configured to vary the throat area of said fan nozzle duct by selectively repositioning said second core cowl baffle with respect to said first core cowl baffle.

9. An inner core cowl baffle assembly in accordance with claim 8 wherein said first and second core cowl baffle are positioned within the fan nozzle duct.

10. An inner core cowl baffle assembly in accordance with claim 8 wherein said actuator assembly is positioned within a portion of said core cowl and is configured to couple said core cowl baffle to said core cowl.

11. An inner core cowl baffle assembly in accordance with claim 9 wherein said actuator assembly comprises a plurality of circumferentially-spaced apart motors, and a plurality of extending rods, each of said plurality of rods is coupled to a respective motor such that actuating at least one of said motors causes a portion of said second core cowl baffle to be translated.

12. An inner core cowl baffle assembly in accordance with claim 9 wherein said actuator assembly is at least one of electrically, pneumatically, or hydraulically powered.

13. An inner core cowl baffle assembly in accordance with claim 8 wherein said actuator assembly repositions a portion said second inner core cowl baffle between a first operational position, a second operational position, and a plurality of operational positions between said first and second operational positions.

14. An inner core cowl baffle assembly in accordance with claim 13 wherein said second inner core cowl baffle is positioned substantially flush with said core cowl in said first operational position, said first operational position facilitates enhancing engine thrust generated from said engine assembly.

15. An inner core cowl baffle assembly in accordance with claim 13 wherein said second inner core cowl baffle is positioned a distance away from said core cowl in said second operational position such that said second operational position facilitates maximizing engine efficiency when the engine assembly is operated a thrust level that is less than maximum thrust.

16. An inner core cowl baffle assembly in accordance with claim 8 wherein said first core cowl baffle is coupled to said core cowl with at least one strut.

17. An inner core cowl baffle assembly in accordance with claim 8 wherein at least one of said first core cowl baffle and said second core cowl baffle includes at least one fixed noise reduction panel.

18. A turbofan engine assembly comprising:
  a core gas turbine engine;
  a core cowl which circumscribes said core gas turbine engine;
  a nacelle positioned radially outward from said core cowl;
  a fan nozzle duct defined between said core cowl and said nacelle; and
  an inner core cowl baffle assembly positioned within said fan nozzle duct comprising:
    a first core cowl baffle coupled to a portion of said core cowl within said fan nozzle duct;
    a second core cowl baffle coupled to a portion of said core cowl and positioned a distance radially inward from said first core cowl baffle; and
    an actuator assembly configured to vary the throat area of said fan nozzle duct by selectively repositioning said second core cowl baffle with respect to said first core cowl baffle.

19. A turbofan engine assembly in accordance with claim 18 wherein said second core cowl baffle includes a first portion and a second portion such that said second portion is upstream from said first portion, said second portion is repositionable with respect to said core cowl and said first portion.

20. A turbofan engine assembly in accordance with claim 18 wherein said first core cowl baffle is coupled to said core cowl with at least one strut.

* * * * *